Figure 1:
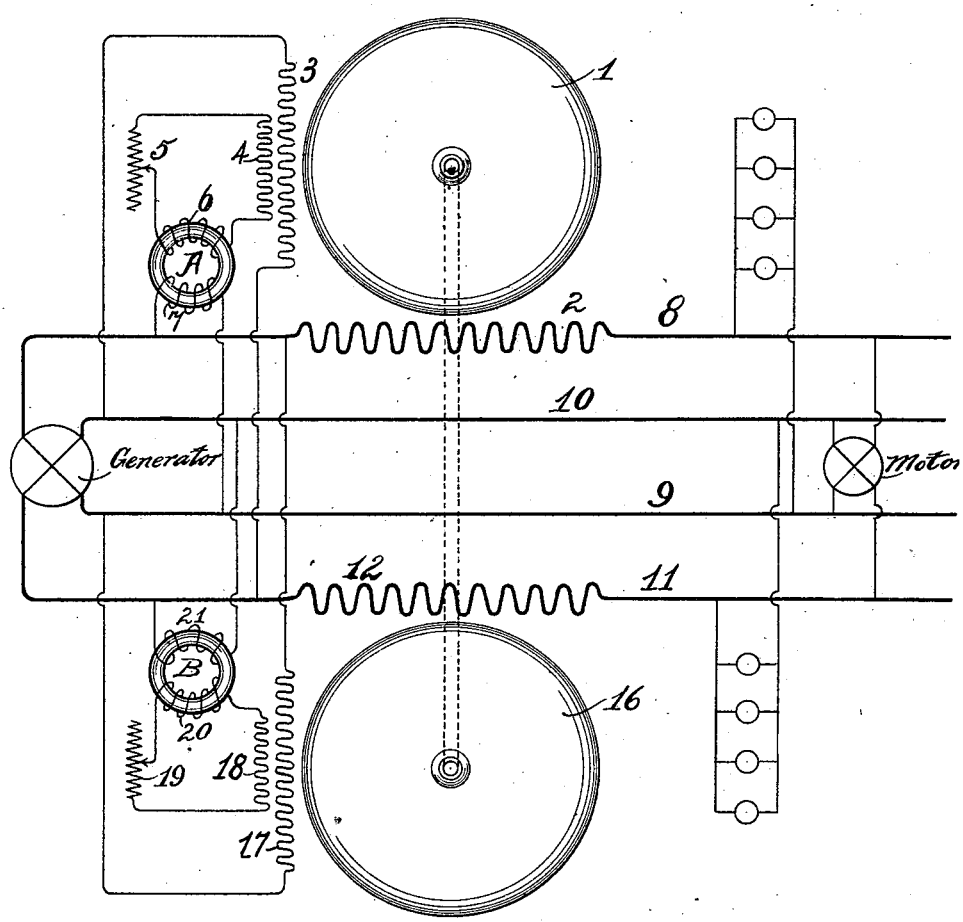

No. 698,658. Patented Apr. 29, 1902.
T. DUNCAN.
MOTOR METER.
(Application filed Sept. 23, 1899. Renewed Jan. 6, 1902.)

(No Model.) 2 Sheets—Sheet 1.

Witnesses
Samuel A. Bachtel
C. E. ——

Inventor:
Thomas Duncan
By his Attorneys
Charles A. Brown + Cragg

No. 693,658. Patented Apr. 29, 1902.
T. DUNCAN.
MOTOR METER.
(Application filed Sept. 23, 1899. Renewed Jan. 6, 1902.)
(No Model.) 2 Sheets—Sheet 2.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

MOTOR-METER.

SPECIFICATION forming part of Letters Patent No. 698,658, dated April 29, 1902.

Application filed September 23, 1899. Renewed January 6, 1902. Serial No. 88,482. (No model.)

*To all whom it may concern:*

Be it known that I, THOMAS DUNCAN, a citizen of the United States, residing at Chicago, in the county of Cook and State of Illinois, have invented a certain new and useful Improvement in Motor-Meters, (Case No. 3,) of which the following is a full, clear, concise, and exact description, reference being had to the accompanying drawings, forming a part of this specification.

My invention relates to meters for measuring alternating currents, and has for its object the provision of an improved motor-meter which is capable of measuring and integrating the energy in a plurality of alternating-current circuits.

In meters of this type two armatures are mounted upon a single spindle, and there is applied to this single spindle a single retarding device, such as a disk rotated in the field of a permanent magnet. In induction-meters of this class it is usual to obtain the magnetic field which represents the electromotive force by connecting the shunt-circuit which produces this field to the circuit carrying one of the phases, while the series or ampere coils are connected directly in circuit with the leads. The two leads of one phase, in series with one of which the series coil is connected, carry a current ninety degrees ahead of the two leads to which the shunt-coil is connected. There is thereby produced a current through the series and shunt circuits, respectively, ninety degrees apart, which is the necessary condition for the operation of induction-meters. I find, however, that due to the self-induction of the pressure-coils used to produce the magnetic field which represents the pressure the current lags beyond ninety degrees, and since the meter is obliged to measure inductive loads an angle of exactly ninety degrees must be obtained. To do this is the object of the apparatus of my invention.

In this meter I employ mechanically-coupled armatures, one for each circuit, for operating the registering-train, each armature being in inductive relation to field-coils, each set of field-coils being so associated with the circuits that the combined torque exerted thereby is proportional to the true energy of the circuits. Thus I am able to construct an integrating-meter in which a single reading shows the energy in the work-conductors of the polyphase system of alternating-current distribution.

A more precise understanding of the invention will be had by reference to the accompanying drawings, illustrating the preferred embodiment of my invention, in which—

Figure 2:
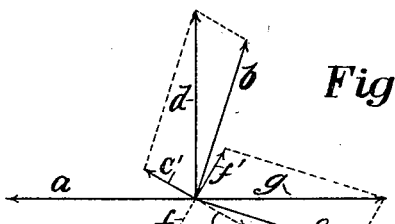
Figure 3:
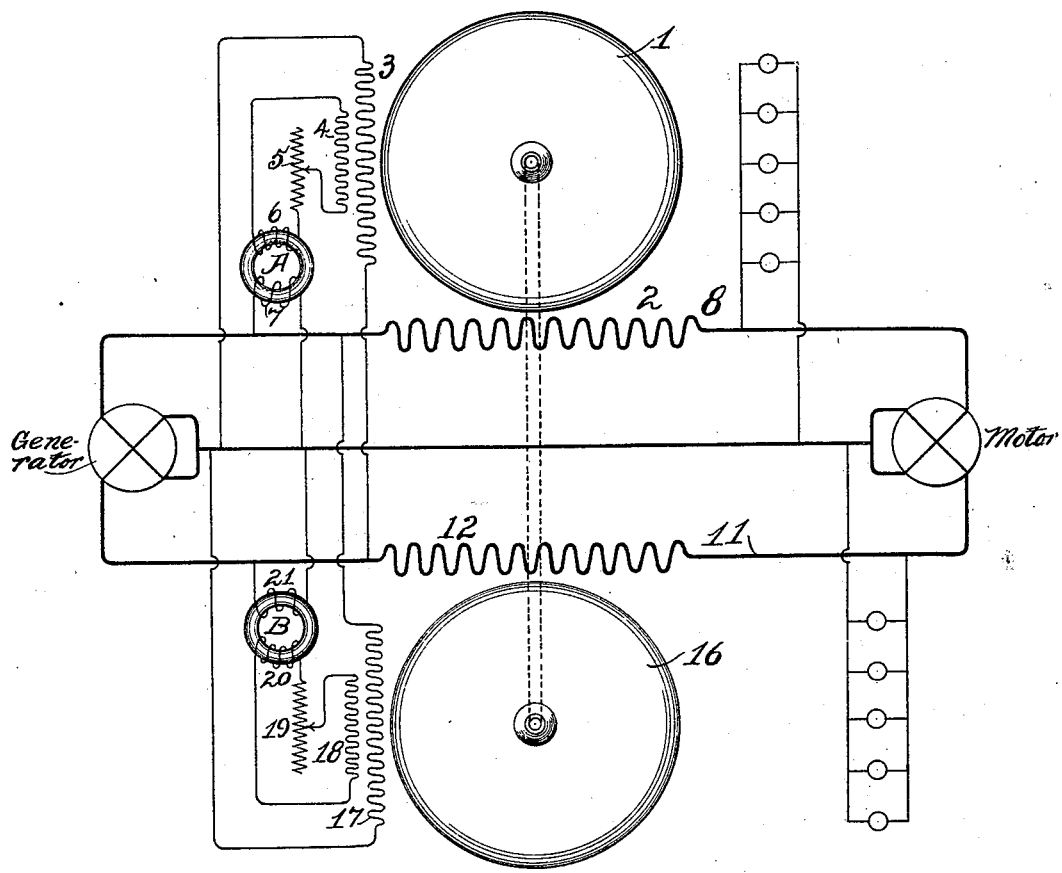
Figure 4:
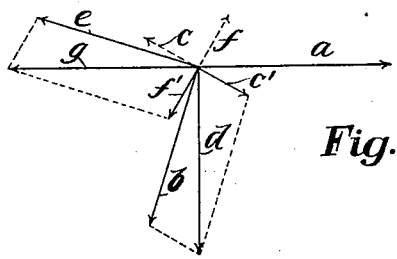

Figure 1 is a diagrammatic view of the arrangement of my meter in its application to the four-wire system of distribution. Fig. 2 is a phase and vector diagram, showing the relation of the magnetism and current in the two circuits during the first half-cycle. Fig. 3 is a diagrammatic view of the arrangement of my invention in its application to a three-wire system of distribution in which a common return-wire is used. Fig. 4 is a phase and vector diagram showing the position and relation of the magnetism and current in the two circuits during the last half-cycle or from one hundred and eighty degrees to three hundred and sixty degrees.

Like parts are indicated by similar characters of reference throughout the different views.

Referring to Fig. 1, the armatures 1 and 16, while shown separate for the sake of clearness, may be assumed to be mechanically coupled together, as indicated by dotted lines. I will explain the relation of the field-coils to the armatures principally with reference to the armature 1 and the field-coils 2 and 3. The series coil 2 is connected in series in the circuit 8 9, and if the load be non-inductive the current through it will be in phase with the electromotive force represented by $a$ in the vector diagram of Fig. 2. The shunt-winding 3 is connected to the leads 10 and 11, in which the phase is ninety degrees behind that of the leads 8 9. Due to the inductance of the coil 3, this current and resultant magnetism are in excess of ninety degrees behind the phase of the current in 8 9 and may be represented by the line $b$ of Fig. 2. To get the magnetism in quadrature with the current represented by the line $a$, I employ a transformer A, whose primary winding 7 is connected with the circuit 8 9, which feeds the series coil 2. The secondary winding 6 of the transformer is connected with the coil 4, which is in inductive relation with the shunt-coil 3, and in circuit with said coil in the secondary of the transformer is the adjustable resistance 5. The induced electromotive-force of the secondary of the transformer 6 is represented in the vector diagram by the line $c$; but by reversing the direction of this current, so that it will be in opposition to the current in coil 3, the phase relation of the secondary circuit of the transformer to that of the coil 3 is shown by the line $c'$. By adjusting the resistance 5 until its magnitude is such that the resultant of the currents in 3 and 4 gives the line $d$ as the resultant magnetism of the coils 3 and 4 the desired result of producing a magnetism in quadrature with the impressed electromotive force of the circuit 8 9 is secured.

Without specifically describing the other armature and its associated field-coils it will be apparent that all that has been said regarding the motive part of the meter represented by the armature 1 and its associated field-coils will be true regarding the second motive part. The series coil 12 is connected in circuit 10 and 11. The main and secondary shunt-coils 17 and 18 are associated in the same manner as that described with reference to coils 3 and 4, and the adjustable resistance 19 in the secondary of the transformer B, the primary of which, 21, is connected in circuits 10 and 11, effects the adjustment of the resultant magnetism of coils 17 and 18 to quadrature with the impressed electromotive force of circuit 10 11 in the same way as that already described with reference to the first motive part of the armature. In this second motive part the line $d$ of Fig. 2 represents the current, (a non-inductive load being assumed.) The line $e$ represents the current through the coil 17; $f$, the secondary electromotive force in the secondary coil 20 of the transformer and in the field-coil 18. The line $f'$ represents the current reversed in coil 18 in opposition to 17, and $g$ represents the resultant magnetism of the coils 17 18.

In Fig. 3 I have shown substantially the same combination of circuits and apparatus as that shown in Fig. 1; but the circuits 9 10 of Fig. 1 are shown in Fig. 3 as combined to constitute a common return. The description already given of the circuits and apparatus of Fig. 1 apply to Fig. 3, with the modification necessary to the combination of the lines 9 and 10.

In the phase and vector diagram of Fig. 4, showing the position of the currents in the two circuits during the last half of cycle, $a$ represents the pressure of the circuit, including series coil 2; $b$, the current in coil 3; $c'$, the current in the secondary of the transformer opposed to that of coil 3, which by adjustment of the resistance 5 effects the resultant $d$ as the magnetism of the coils 3 and 4 in quadrature with $a$, and assuming the line $d$, representing the current in the coil 11; $e$, the magnetism of the coil 17; $f'$, that of coil 18 with current reversed, and $g$ the resultant secured by adjustment of the resistance 19 of the magnetism of coils 17 and 18 in quadrature with $d$.

In the foregoing description it will be seen that the torque of each motive part is applied to the spindle, so that the speed and torque of the combined motive parts at any instant represent the true watts passing through the meter, whether it be either side alone or both sides that are being operated.

I have not deemed it necessary to show the counting-train, the retarding device, and the initial torque device, which are well understood by those skilled in the art.

While I have shown my invention as applied to diphase circuits, I do not wish to be limited to this application, as it will be apparent to those skilled in the art that other applications of the invention are possible; nor do I wish to be limited to the precise instrumentalities shown, as modifications thereof may be made without departing from the spirit of my invention.

Having thus described my invention, what I claim as new, and desire to secure by Letters Patent, is—

1. In a polyphase-current induction motor-meter, the combination with two motor members, each comprising series and pressure windings for receiving current from the circuit, and each having an armature in inductive relation with the said windings, of transformers having their primaries connected in parallel in circuits including said series windings, and auxiliary pressure-windings in the secondary circuits of said transformers adapted to modify the magnetism of the said pressure-windings to bring the same into quadrature with the impressed electromotive force of the circuit including said series winding, a pressure-winding of one motor member receiving current from the circuit supplying current to the current-winding of the other motor member, substantially as described.

2. In a polyphase-current induction motor-meter, the combination with two or more armatures coupled together, of a current and a pressure winding in inductive relation with each of said armatures, each pressure-winding receiving current from the circuit supplying the current-winding associated with the other pressure-winding, the current in each pressure-winding lagging beyond ninety degrees with relation to the pressure in the circuit including its associated current-winding, and a second pressure-winding associated with each of the aforesaid pressure-windings and carrying current lagging less than ninety degrees with relation to the pressure in the circuit including its associated current-winding, whereby the magnetism due to said pressure-windings is brought in quadrature with the electromotive force of the circuit including said current-winding, substantially as described.

3. In a device of the class described, the combination with two or more armatures coupled together, of a current and a pressure winding in inductive relation with each of said armatures, transformers having their primaries connected in parallel in the circuits including said current-windings, a second pressure-winding in the secondary circuit of each of said transformers and adjusting resistances in series with said last-named windings, whereby the magnitude of the current in said secondary circuits may be modified and the magnetism of the pressure-windings be brought in quadrature with the impressed electromotive force of the circuit including said current-coil, a pressure-winding of one motor member receiving current from the circuit supplying current to the current-winding of the other motor member, substantially as described.

4. In a polyphase-current induction motor-meter, the combination with two motive sets of windings each comprising a current and a pressure winding, each pressure-winding receiving current from the circuit supplying the current-winding associated with the other pressure-winding, the current in each pressure-winding lagging beyond ninety degrees with relation to the pressure in the circuit including its associated current-winding, and a second winding associated with each of said pressure-windings and carrying current lagging less than ninety degrees with relation to the pressure in the circuit including its associated current-winding, whereby the magnetism due to said pressure-windings is brought in quadrature with the electromotive force of the circuit including said current-winding, and a movable element subjected to the action of said motive sets of windings, substantially as described.

5. In a polyphase-current induction motor-meter, the combination with two motive sets of windings each comprising a current and a pressure winding, each pressure-winding receiving current from the circuit supplying the current-winding associated with the other pressure-winding, the current in each pressure-winding lagging beyond ninety degrees with relation to the pressure in the circuit including its associated current-winding and a second winding associated with each of said pressure-windings and carrying current lagging less than ninety degrees with relation to the pressure in the circuit including its associated current-winding, and means included in series with each of said second pressure-windings for adjusting the magnetism due thereto, whereby the magnetism due to said pressure-windings is brought in quadrature with the electromotive force of the circuit including said current-winding, and a movable element subjected to the action of said motive sets of windings, substantially as described.

6. In a device of the class described, the combination with two or more armatures coupled together, of a current and a pressure winding in inductive relation with each of said armatures, said pressure-winding being connected with a circuit carrying a current with a phase ninety degrees behind that of the circuit including the current-winding and means extraneous to the pressure-winding circuit for maintaining this phase relation between the current in the pressure-coil and the electromotive force of the circuit including the current-coil, substantially as described.

7. In a device of the class described, the combination with two or more armatures coupled together, of a current and a pressure winding in inductive relation with each of said armatures, said pressure-winding being connected with a circuit carrying a current with a phase ninety degrees behind that of the circuit including the current-winding, a transformer having its primary connected in shunt of a circuit including the current-winding, and a winding in circuit with the secondary of said transformer and adapted to maintain the magnetism of the pressure-winding in quadrature with the electromotive force of the circuit including the current-winding, substantially as described.

8. In a device of the class described, the combination with two or more armatures coupled together, of a current and a pressure winding in inductive relation with each of said armatures, said pressure-winding being connected with a circuit carrying a current with a phase ninety degrees behind that of the circuit including the current-winding, and a transformer having its primary connected in shunt of a circuit including the current-winding, and a winding and an adjustable resistance in circuit with the secondary of said transformer and adapted to maintain the magnetism of the pressure-winding in quadrature with the electromotive force of the circuit including the current-winding, substantially as described.

9. In a device of the class described, the combination with two or more armatures coupled together, of a current and a pressure winding in inductive relation with each of said armatures, said pressure-winding being connected with a circuit different from that including the current-winding, and means extraneous to the pressure-winding circuit for securing and maintaining a lag of ninety degrees between the magnetism of the pressure-winding and the electromotive force of the circuit including the current-coil, substantially as described.

10. In a device of the class described, the combination with two or more armatures coupled together, of a current and a pressure winding in inductive relation with each of the said armatures, said pressure-winding being connected with a circuit different from that including the current-winding, a transformer having its primary connected in shunt of a circuit including the current-winding, and a winding in the circuit with the secondary of the said transformer and associated with the said pressure-winding, whereby the resultant magnetism of pressure-winding is maintained in quadrature with the electromagnet force of the circuit including the current-winding, substantially as described.

11. In a polyphase-current meter, the combination with two motor members, each having current and pressure windings for association with the circuit, of transformers having their primaries connected in parallel in circuits including said current-windings, and auxiliary pressure-windings in the secondary circuits of said transformers adapted to secure the desired modification of the phase of the magnetism due to the pressure-windings, the main pressure-windings receiving current from circuits respectively different from those supplying their associated auxiliary pressure-windings, substantially as described.

12. In a device of the class described, the combination with current-windings, of pressure-windings each included in a circuit different from that including the corresponding current-winding, means extraneous to the pressure-winding circuits for securing and maintaining the desired phase relation between the magnetism of the pressure-winding and the electromotive force of the circuit including the corresponding current-winding and a movable element subject to the actions of said windings, substantially as described.

13. In a device of the class described, the combination with current-windings, of pressure-windings, each included in a circuit different from that including the corresponding current-winding, a transformer associated with each pressure-winding, the primary of each transformer receiving current from the circuit including the current-winding corresponding to the pressure-winding associated with the transformer, and a secondary pressure-winding in each secondary transformer circuit each of the first aforesaid pressure-windings being operatively associated with a secondary pressure-winding whereby the desired modification of the phase of the magnetism due to the pressure-windings may be secured, substantially as described.

14. In a motor, the combination with current and pressure windings thereof, a transformer, and an auxiliary pressure-winding operatively associated with the aforesaid pressure-winding to modify the phase of the magnetism due thereto and receiving current from the secondary of said transformer, the first aforesaid pressure-winding receiving current from a circuit different from that supplying current to the primary of said transformer, substantially as described.

In witness whereof I hereunto subscribe my name this 13th day of September, A. D. 1899

THOMAS DUNCAN.

Witnesses:
CHARLES A. BROWN,
GEORGE L. CRAGG.